United States Patent Office 2,951,203
Patented Aug. 30, 1960

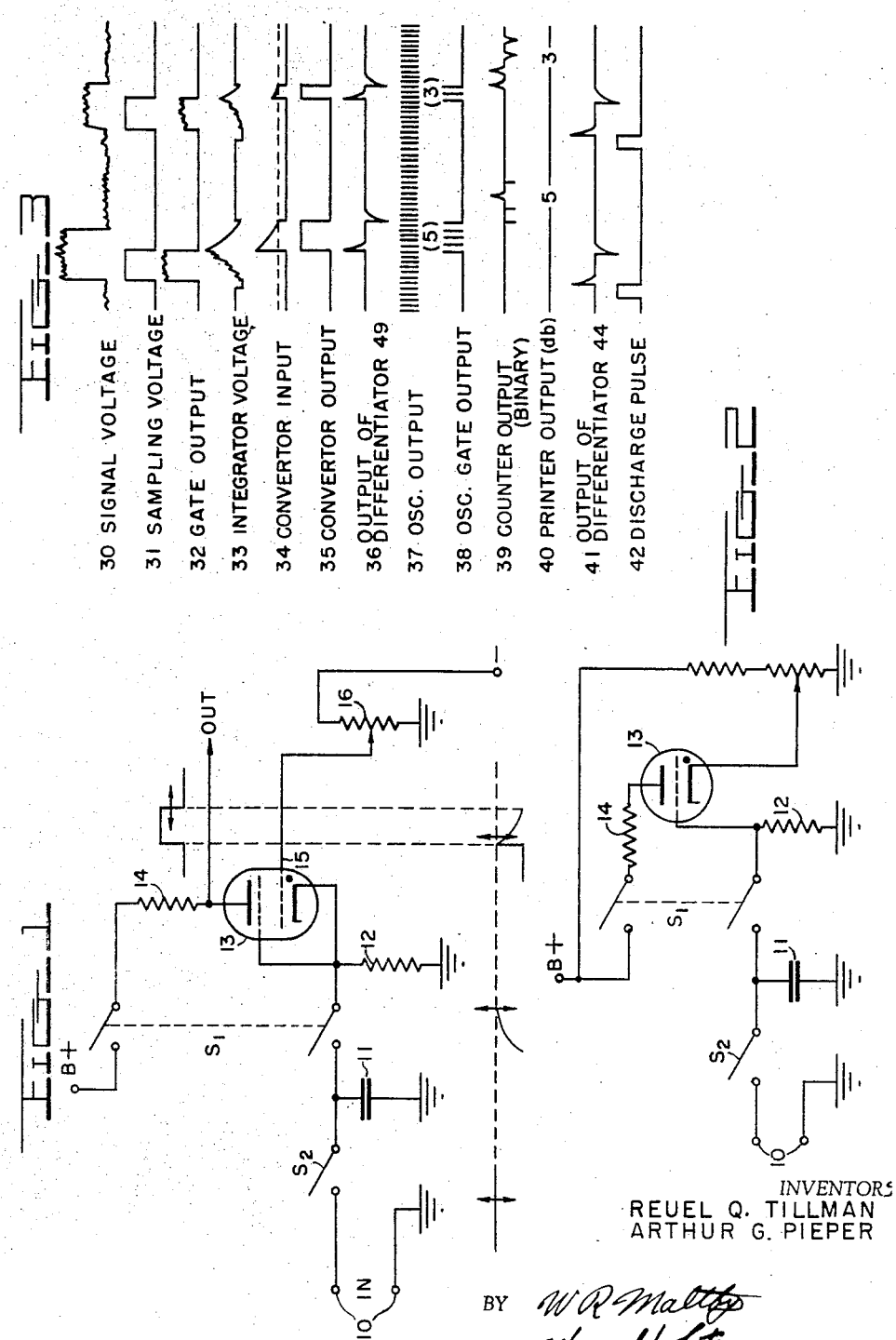

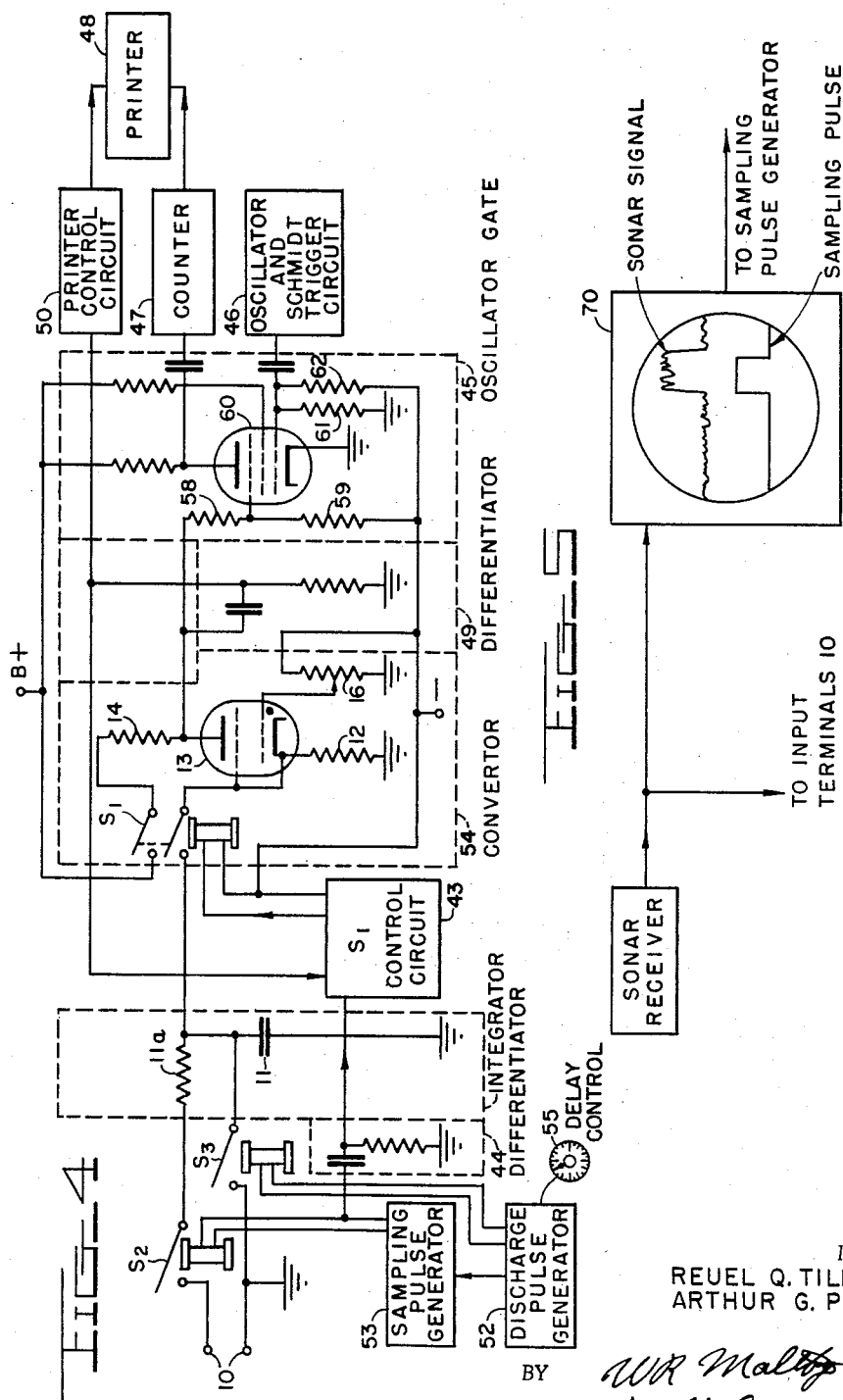

2,951,203
VOLTAGE MEASURING DEVICE

Reuel Q. Tillman, Prince Georges County, Md., and Arthur G. Pieper, Alexandria, Va., assignors to the United States of America as represented by the Secretary of the Navy Filed Aug. 31, 1955, Ser. No. 531,852

9 Claims. (Cl. 324—111)

(Granted under Title 35, U.S. Code (1952), sec. 266)

The invention described herein may be manufactured and used by or for the Government of the United States of America for governmental purposes without the payment of any royalties thereon or therefor.

This invention relates generally to voltage measuring devices and more specifically to a system for converting voltage amplitude to pulse length.

Measurement of voltage amplitude is an essential function in countless electronic applications, and there are many known measuring procedures. Usually the specific purpose to be served or other characteristics of the voltage measurement dictates specific measurement procedures. For example, where it is desired to measure voltage amplitude against time it is the usual practice to feed the voltage to the pen of a traveling chart recorder, or more rapid variations may be recorded photographically from oscilloscopes. However, the records thus obtained are merely a graphical representation of the voltage and must be tediously tabulated before making an evaluation thereof. A concrete example is presented in the recording of data from a sonar receiver. Here it is desirable to tabulate the data in decibels for most convenient processing. Decibels will hereafter be indicated by their customary abbreviation db.

It is accordingly an object of this invention to record voltage amplitude directly in db.

It is another object of this invention to record voltage amplitude in directly useable form.

It is another object of this invention to measure voltage amplitude directly in db.

It is another object of this invention to convert voltage amplitude to pulse duration.

It is another object of this invention to convert voltage amplitude in logarithmic proportion to pulse duration.

Other objects and advantages of this invention will become apparent from the following description and accompanying drawings wherein:

Fig. 1 is a simplified schematic diagram illustrating this invention,

Fig. 2 is a variant embodiment of Fig. 1.

Fig. 3 is a series of waveforms useful in explaining the operation of Fig. 4,

Fig. 4 is a schematic diagram partly in block of a data processing system according to this invention, and Fig. 5 is a circuit for indicating synchronization of the circuit of Fig. 4 with sonar signals.

Briefly, this invention measures voltage by converting it to pulse duration and then measuring the pulse duration. This measurement may be printed directly in terms of db and time. A printed record of a variable voltage may be made by sampling the voltage at any desired rate by means such as a mechanically operated switch or an electronically triggered gating circuit. During the sampling period the voltage quantity is fed to an integrating circuit where the value of the integral over the sampling period is stored. This value is used to control the firing time of a gas tube and thus produce a voltage pulse whose duration is proportional to the logarithm of the integrator voltage. This variable duration pulse may be used to gate an oscillator to a counter to register a binary count thereon in terms of pulse length. Information may be taken directly from the binary counter or may be sent to a printer to print voltage amplitude directly in terms of db.

Referring now to Figure 1 in detail, the voltage to be measured is applied to input terminals 10. When switch $S_2$ is closed, the voltage is applied across condenser 11. This provides a low resistance charging circuit and condenser 11 quickly charges to the level of the voltage at terminals 10. If the charging current becomes too heavy some series limiting resistance may be inserted at the input to switch $S_2$. To measure the voltage built up across condenser 11, switch $S_2$ is opened and switch $S_1$ is closed. Switch $S_1$ is a double pole, single throw switch which connects condenser 11 in parallel with a resistor 12 connecting the cathode of gas tube 13 to ground. The other section of switch $S_1$ connects the anode of tube 13 through load resistor 14 to B+. Control grid 15 of tube 13 is connected to a negative potential as established by the tap on potentiometer 16 which is selected to prevent the tube from firing until the potential across resistor 12 has reached a predetermined level. Thus after opening switch $S_2$, switch $S_1$ is closed and condenser 11 caused to discharge through resistance 12. When condenser 11 has sufficiently discharged as determined by the setting of potentiometer 16, the firing potential is reached and tube 13 is permitted to fire. Closing switch $S_1$ also connects the anode of tube 13 to B+ through load resistor 14 thus putting the tube in condition to be fired. Closing of switch $S_1$ raises the anode of tube 13 to the level of B+ due to the nonconducting state of the tube and thus produces a sharp voltage rise at the anode, this occurs simultaneously with the closing of switch $S_1$ and marks the initiation of the output pulse. When tube 13 fires the heavy flow of current therethrough produces a sharp voltage drop across resistor 14 and this serves as the termination of the output pulse. Since the delay in firing of tube 13 depends on the amplitude from which condenser 11 must be discharged to fire the tube, the amplitude of the input voltage applied to condenser 11 has been changed to a pulse whose duration varies in accordance with the input voltage amplitude. This is illustrated by oscillograms in Figure 1. As is well known, the discharge of a condenser through a resistance traces an exponential path with respect to a linear time base. Since the time required for tube 13 to be fired after switch $S_1$ is closed is dependent upon the amplitude to which condenser 11 was charged, and since condenser 11 discharges toward the firing level of tube 13 at an exponential rate, it becomes apparent that the duration of the output pulse bears an exponential relation to the amplitude of the voltage across condenser 11. Since a logarithmic variation with respect to a linear time base traces the same exponential path and since db is a logarithmic expression, it follows that the pulse duration has a linear relation to db.

Although Fig. 1 shows the input voltage charging condenser 11 in a positive direction and applied as a diminishing voltage to the cathode of gas tube 13, it will be understood that the integrator voltage can equally well be applied to the grid of tube 13 provided condenser 11 is charged in a negative direction and the discharge voltage applied to the grid of the gas tube as an exponentially rising voltage. A specific arrangement for operating the grid of the converter tube is illustrated in Figure 2. It will be noted that in Figure 2 the cathode of the gas tube is returned to an adjustable positive voltage to permit adjustment of the firing potential of the tube.

Referring now to Figure 4 in detail, there is shown a voltage measuring and recording system according to this invention particularly adapted for processing data from sonar receivers. The waveforms shown in Figure 3 illustrate the operation of Figure 4 and will be discussed therewith. While many standard circuits are represented by blocks in Figure 4, sufficient circuitry is portrayed schematically to clearly demonstrate a preferred arrangement for operating the gates and relays. A signal voltage comprising sonar echoes is shown at waveform 30 and is applied to terminals 10 of Figure 4. Switch $S_2$ is normally open but is closed upon excitation of its associated relay coil which is controlled by pulses from sampling pulse generator 53 as shown in waveform 31. It will be noted that in processing sonar data it is essential to synchronize the sampling voltage with the received echoes as indicated by the time relation between waveforms 30 and 31. This is accomplished by adjusting the phase of the sampling pulse as further described below. Closing of switch $S_2$ feeds the signal samples to an integrator consisting of condenser 11 and charging resistor 11A. The addition of the series charging resistor causes condenser 11 to average the signal applied while switch $S_2$ is closed. While only the simplest form of integrator is illustrated in Figure 4, it will be understood that more complex integrating circuits may be substituted.

To measure the amplitude of the charge on condenser 11, switch $S_1$ is closed and condenser 11 permitted to discharge through cathode resistor 12 of tube 13 toward the firing potential of tube 13. To prevent discharging of condenser 11 through the input circuit, switch $S_2$ must be opened before or synchronously with the closing of switch $S_1$. Switch $S_2$ is opened by the termination of the sampling pulse from generator 53, switch $S_2$ may be closed synchronously with the trailing edge of the sampling pulse. This is accomplished by actuating switch $S_1$ by a relay coil controlled by the $S_1$ control circuit 43 which is operated by the trailing edge of the sampling pulse as obtained through differentiator 44. $S_1$ control circuit 43, while shown only in block diagram, may take many forms but preferably includes a bi-stable multivibrator arranged to be triggered into state 1 by the trailing edge of the sampling pulse, the negative peak illustrated in waveform 41, and back into state 2 by the trailing edge of the converter output pulse, the negative pips shown in waveform 36. The control circuit 43 is connected to the switch $S_1$ relay coil to hold the switch closed for the duration of state 1. Thus it will be seen that switch $S_2$ is closed only during the generation of the converter output pulse. As pointed out in Figure 1, closing of switch $S_1$ connects the anode of tube 13 to B+ thus raising the anode potential due to the non-conducting state of the tube and producing the leading edge of a positive output pulse shown in waveform 35. In Figure 4 the anode circuit of tube 13 also forms part of a voltage divider comprising anode load resistor 14 and series resistances 58 and 59. The mid point of resistors 58 and 59 are connected to the suppressor grid of a gating tube 60. Upon closing of switch $S_1$ the voltage divider is energized and the junction of resistors 58 and 59 is raised to a level permitting the gating tube 60 to conduct or to pass the signals on its control grid. When the integrator has discharged to a predetermined level as indicated in waveform 34, gas tube 13 is biased conducting and the voltage at its anode drops very rapidly due to the heavy current through anode load resistor 14. This drop in voltage represents the termination of the converter output pulse 35. It also drops the voltage at the suppressor of tube 60 to a level sufficiently negative to close the gate. The converter output pulse is also differentiated in differentiator 49 shown in waveform 36, these pulses are fed back to the $S_1$ control circuit 43 which responds to the negative pulse marking the termination of the converter output pulse to remove the energy from the relay coil of switch $S_1$ to permit the switch to open. Opening switch $S_1$ removes the discharge path of condenser 11 permitting it to recharge during the next sampling pulse and also disconnects the anode of the tube 13 from B+, thus interrupting conduction by tube 13 without generating an output pulse and deenergizing the voltage divider controlling tube 60 to prevent the non-conduction of tube 13 from opening gate 60.

To measure the duration of the converter output pulse 35, an oscillator 46, which includes a Schmidt trigger circuit to produce a continuous train of sharp pulses, is coupled to the control grid of gating tube 60. Since the gating tube 60 is open only for the duration of the converter output pulse, there appears at its anode a number of pulses representative of the converter output pulse duration. This group of pulses is fed to a counter 47. While the signal voltage amplitude may be read directly from counter 47, for repetitive signal pulses it is preferable to print a record of the amplitude of each and thus the output of counter 47 is fed to a printer 48. The differentiated pulses from circuit 49 are fed to the printer control circuit which is arranged to respond to the negative pips coincident with the termination of the converter output pulse. Thus the printer will be actuated after the converter output pulse is terminated and after the counter has completed counting the oscillator pulses passed by gating tube 60.

While waveform 30 of Figure 3 and the discussion of Figure 4 have been directed to the operation of this invention with received sonar echoes, it will be understood that this invention may readily be adapted to measurement of higher frequency pulses simply by increasing the frequency of sampling pulse generator 53 and, if the recurrence frequency is sufficiently high, replacing all relays with faster acting electronic switches. It will also be readily apparent that this invention may be used to measure voltage amplitude of non-varying voltages. The invention may also be used to measure and record the amplitude of voltage variations other than those synchronized with the sampling pulse provided the sampling rate is made sufficiently high with respect to the voltage variation rate.

It will be noted that during most of the period between sampling pulses condenser 11 is isolated because of the open condition of switches $S_1$ and $S_2$. Thus condenser 11 will tend to retain any residual charge remaining when switch $S_1$ is opened. Since $S_1$ does not open until tube 13 conducts and conduction in tube 13 develops a potential across resistor 12 which is applied to condenser 11, the condenser normally retains a quiescent charge until recharged through $S_2$. Although a low resistance charging circuit could be relied on to dissipate this charge during the sampling pulse, in the preferred embodiment shown in Fig. 4 a discharge switch $S_3$ is provided to completely discharge the condenser before the next sampling pulse. Switch $S_3$ is a relay operated by a discharge pulse generator 52. To provide correct timing of the discharge pulse, generator 52 is operated at the transmitter pulse frequency such as by direct synchronization therewith but is delayed therefrom under the control of delay control 55 to produce a pulse just before the receipt of a sonar echo as shown in waveform 42. This pulse is applied to switch $S_3$ to zero the integrator just before the sampling pulse as shown in waveform 33. The sampling pulse generator 53 is then triggered by the discharge pulse to initate a pulse at the termination of the discharge pulse.

Alternatively, instead of using the manual delay control 55, the consecutive operation of pulse generators 52 and 53 may be initiated in response to the receipt of a sonar echo thus permitting the observation of several sonar echoes for each transmitter ping.

As discussed in connection with Figure 1, the indication on counter 47 and the record of printer 48 in Figure 4 may be taken directly in decibels. To calibrate these indicating devices to indicate directly in decibels, the frequency of oscillator 46 need merely be adjusted so that the correct number of pulses are supplied to counter 47 for a given converter output pulse duration.

A comparison of waveforms 30 and 31 of Figure 3 with respect to time indicates that the sampling pulse and the signal pulse must be closely aligned in time to provide an integration of the signal by the integrator. This is best accomplished as shown in Figure 5 by viewing waveforms 30 and 31 on an oscilloscope having a double time trace. Typically this would be accomplished by using a double cathode ray tube to respectively receive the receiver signals and the sampling pulse on the same time base. The delay control 55 of Fig. 4 is then adjusted manually to show synchronism with the received echo pulses as observed on the oscilloscope.

While only limited embodiments of this invention have been herein disclosed and described, it will be understood that many modifications may of course be made without departing from the spirit and scope of this invention as defined in the appended claims.

What is claimed is:

1. A voltage amplitude to pulse length converter comprising, a normally non-conducting electron discharge tube, a condenser, a condenser discharge path for discharging said condenser at a predetermined rate and connected to said tube to raise its bias toward conduction as said condenser is discharged, means alternately connecting said condenser to a signal voltage and to said discharge path, means initiating an output pulse when said condenser is connected to its discharge path and means terminating said output pulse when said tube becomes conductive.

2. A voltage amplitude to pulse length converter comprising, an electron discharge tube biased beyond cut-off, a condenser, a condenser discharge path for discharging said condenser at a predetermined rate and connected to said tube to raise its bias toward conduction as said condenser is discharged, means alternately connecting said condenser to a signal voltage and to said discharge path, a plate supply source for said tube and a plate load resistor connected between said tube and said source, and means disconnecting said tube from said source except when said condenser is connected to its discharge path whereby an output pulse is produced at the load resistor having a duration equal to the time required for said condenser to discharge to the cut-off level of said tube.

3. An amplitude to time converter comprising, an electron discharge tube having resistors in its anode and cathode circuit, an anode supply source, means biasing said tube beyond cut-off, an integrator, means alternately connecting said integrator to a signal and to the cathode of said tube, means connecting said tube to the anode supply source synchronously with the connection of said integrator to the cathode of said tube, and an output terminal at the anode of said tube producing pulses of a length determined by signal amplitude.

4. An amplitude to time converter comprising, a grid controlled gas tube having resistors in its anode and cathode circuit, an anode supply source, means biasing said tube beyond cut-off, an integrator, means alternately connecting said integrator to a signal and to the cathode of said tube, means connecting said tube to the anode supply source synchronously with the connection of said integrator to the cathode of said tube, and an output terminal at the anode of said tube producing pulses of a length proportional to the logarithm of the signal amplitude.

5. An amplitude to time converter comprising, a grid controlled gas tube having resistors in its anode, an anode supply source, means biasing said tube beyond cut-off, an integrator, means alternately connecting said integrator to a signal and to the grid of said tube, means connecting said tube to the anode supply source synchronously with the connection of said integrator to the grid of said tube, and an output terminal at the anode of said tube producing pulses of a length proportional to the logarithm of the signal amplitude.

6. A voltage measuring device comprising a grid controlled gas tube having resistors in its anode and cathode circuit, an anode supply source, means biasing said tube beyond cut-off, an integrator, means alternately connecting said integrator to a signal and to the cathode of said tube, means connecting said tube to the anode supply source synchronously with the connection of said integrator to the cathode of said tube, an output terminal at the anode of said tube producing pulses of a length proportional to the logarithm of the signal amplitude, an oscillator and a counter, an oscillator gating circuit connecting said oscillator to said counter, and means connecting said oscillator gate to said output terminal.

7. A voltage measuring device comprising a grid controlled gas tube having resistors in its anode and cathode circuit, an anode supply source, means biasing said tube beyond cut-off, an integrator, means alternately connecting said integrator to a signal and to the cathode of said tube, means for discharging said integrator prior to its connection to said cathode, means connecting said tube to the anode supply source synchronously with the connection of said integrator to the cathode of said tube, an output terminal at the anode of said tube producing pulses of a length proportional to the logarithm of the signal amplitude, an oscillator and a counter, an oscillator gating circuit connecting said oscillator to said counter, and means connecting said oscillator gate to said output terminal.

8. A voltage measuring device comprising a grid controlled gas tube having resistors in its anode and cathode circuit, an anode supply source, means biasing said tube beyond cut-off, an integrator, means alternately connecting said integrator to a signal and to the cathode of said tube, means connecting said tube to the anode supply source synchronously with the connection of said integrator to the cathode of said tube, an output terminal at the anode of said tube producing pulses of a length proportional to the logarithm of the signal amplitude, an oscillator and a counter, an oscillator gating circuit connecting said oscillator to said counter, means connecting said oscillator gate to said output terminal, a counter printer connected to said counter, and means actuating said printer after the termination of a pulse at said output terminal.

9. A voltage measuring device comprising a grid controlled gas tube having resistors in its anode and cathode circuit, an anode supply source, means biasing said tube beyond cut-off, an integrator, a voltage sampling circuit periodically connecting the voltage to be measured to said integrator, means connecting the intgerator to the cathode of said tube in response to the termination of each sampling period and simultaneously connecting said tube to the anode supply source, an output terminal at the anode of said tube producing pulses of a length proportional to the logarithm of the signal amplitude, an oscillator and a counter, an oscillator gating circuit connecting said oscillator to said counter, means connecting said oscillator gate to said output terminal, a counter printer connected to said counter, and means actuating said printer after the termination of a pulse at said output terminal.

References Cited in the file of this patent

UNITED STATES PATENTS

| | | |
|---|---|---|
| 2,050,882 | Fitzgerald | Aug. 11, 1936 |
| 2,132,264 | King | Oct. 4, 1938 |
| 2,141,343 | Campbell | Dec. 27, 1938 |
| 2,220,602 | Hellman | Nov. 5, 1940 |
| 2,309,560 | Welty | Jan. 26, 1943 |

(Other references on following page)